United States Patent
Son et al.

(10) Patent No.: US 9,977,553 B2
(45) Date of Patent: May 22, 2018

(54) TOUCH PANEL AND MANUFACTURING METHOD THEREOF

(71) Applicant: Samsung Display Co., Ltd., Yongin-si (KR)

(72) Inventors: Jung Ha Son, Seoul (KR); Jae-Wook Kang, Hwaseong-si (KR); Kyung Seop Kim, Hwaseong-si (KR); Sung Kyun Park, Suwon-si (KR); Sang Kyu Choi, Daejeon (KR); Yong Woo Park, Yongin-si (KR); Sang Youn Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 157 days.

(21) Appl. No.: 15/007,964

(22) Filed: Jan. 27, 2016

(65) Prior Publication Data

US 2017/0017318 A1    Jan. 19, 2017

(30) Foreign Application Priority Data

Jul. 15, 2015    (KR) .................. 10-2015-0100640

(51) Int. Cl.
*G06F 3/044*    (2006.01)

(52) U.S. Cl.
CPC .... *G06F 3/044* (2013.01); *G06F 2203/04102* (2013.01); *G06F 2203/04103* (2013.01)

(58) Field of Classification Search
CPC ................. G06F 3/044; G06F 2203/04112
See application file for complete search history.

(56) References Cited

U.S. PATENT DOCUMENTS

| 9,122,362 | B2 | 9/2015 | Park et al. | |
| 2013/0087441 | A1* | 4/2013 | Kim | H03K 17/9618 200/5 A |
| 2014/0360855 | A1 | 12/2014 | Kim et al. | |
| 2015/0022731 | A1 | 1/2015 | Kang et al. | |
| 2015/0060125 | A1* | 3/2015 | Stevenson | G06F 3/044 174/261 |

FOREIGN PATENT DOCUMENTS

| KR | 10-2013-0087746 | 8/2013 |
| KR | 10-1368684 | 3/2014 |
| KR | 10-2014-0143645 | 12/2014 |
| KR | 10-2015-0006228 | 1/2015 |
| KR | 10-2015-0009846 | 1/2015 |

* cited by examiner

*Primary Examiner* — Christopher Kohlman
(74) *Attorney, Agent, or Firm* — H.C. Park & Assoicates, PLC

(57) ABSTRACT

A touch panel includes a substrate, a first signal line, and a second signal line. The first signal line extends on the substrate in a first direction and includes a first height from the substrate. The second signal line extends on the substrate in a second direction crossing the first direction and includes a second height from the substrate. The second signal line is disposed in the same layer as the first signal line. The second height is greater than the first height.

22 Claims, 9 Drawing Sheets

TOUCH PANEL AND MANUFACTURING METHOD THEREOF

CROSS-REFERENCE TO RELATED APPLICATION

This application claims priority from and the benefit of Korean Patent Application No. 10-2015-0100640, filed on Jul. 15, 2015, which is hereby incorporated by reference for all purposes as if fully set forth herein.

BACKGROUND

Field

Exemplary embodiments relate to a touch panel and a method for manufacturing the same.

Discussion

Conventional touch panels may recognize a touch by a pen or a user's finger as a means for inputting a signal to a display device. A touch panel may be disposed on the display panel, such as an organic light emitting diode (OLED) display, a liquid crystal display (LCD), and the like. Typical touch panels may include a substrate and a touch sensor unit disposed on the substrate to detect a touch. A capacitive type touch sensor unit may detect a touch by sensing a variation in capacitance generated between a first signal line and a second signal line crossing each other based on the presence of an input object, e.g., a stylus, finger, etc.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments provide a touch panel including a touch sensor unit with limited or suppressed visual recognition.

One or more exemplary embodiments provide a method of manufacturing a touch panel including a touch sensor unit limited or suppressed visual recognition.

Additional aspects will be set forth in the detailed description which follows, and, in part, will be apparent from the disclosure, or may be learned by practice of the inventive concept.

According to one or more exemplary embodiments, a touch panel includes a substrate, a first signal line, and a second signal line. The first signal line extends on the substrate in a first direction and includes a first height from the substrate. The second signal line extends on the substrate in a second direction crossing the first direction and includes a second height from the substrate. The second signal line is disposed in the same layer as the first signal line. The second height is greater than the first height.

According to one or more exemplary embodiments, a method of manufacturing a touch panel includes: forming a first signal line on a substrate, the first signal line extending in a first direction; forming a first insulating layer on the substrate, the first insulating layer covering the first signal line and comprising an opening extending in a second direction crossing the first direction; and forming a second signal line in the opening, the second signal line extending in the second direction. A first height of the first signal line from the substrate is smaller than a second height of the second signal line from the substrate.

According to one or more exemplary embodiments, the respective heights of the first and second signal lines enables incident light to be reflected from the first and second signal lines, but because the paths of the reflected light off the first and second signal lines are substantially similar, the first and second signal lines are not readily visible to an observer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
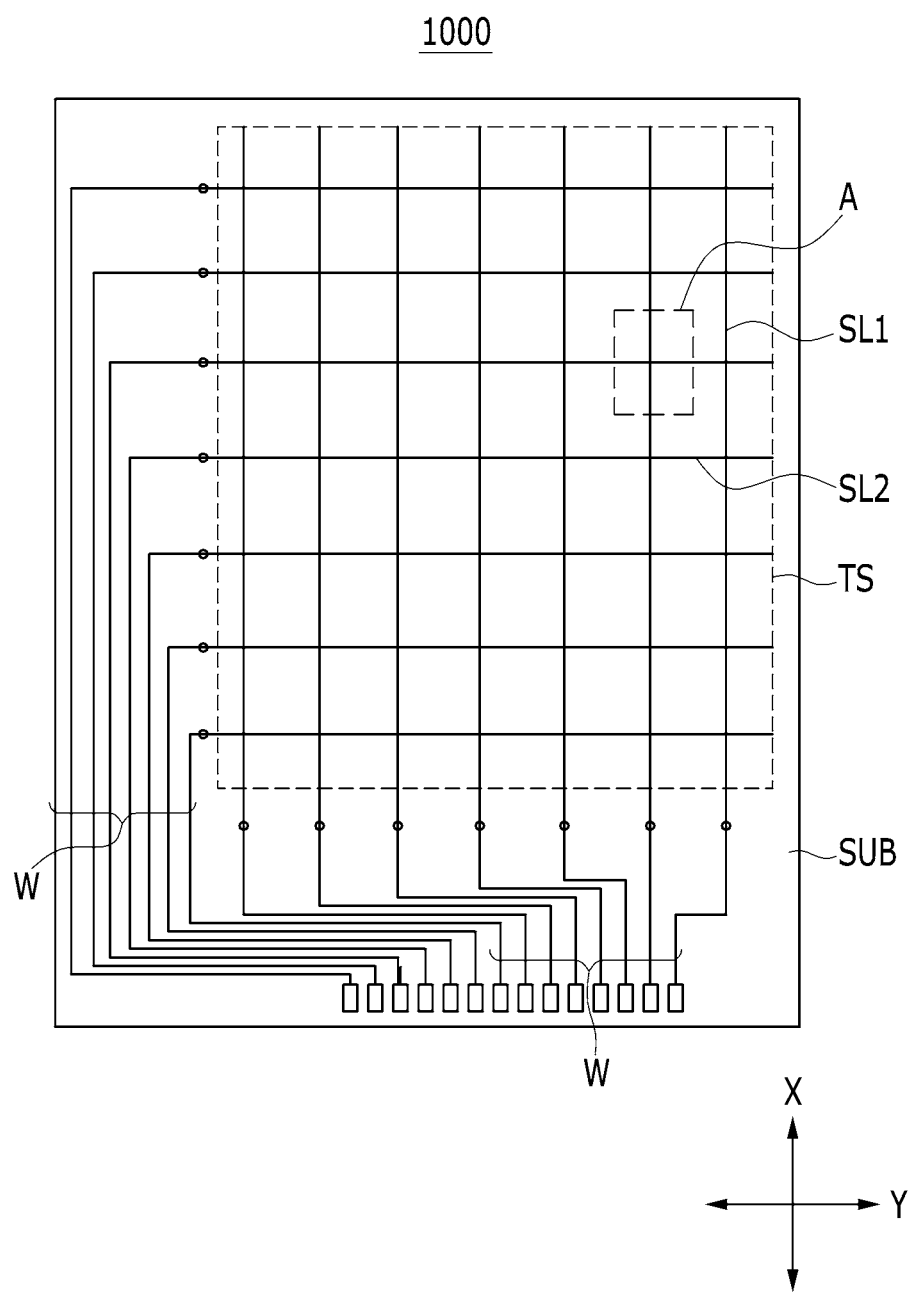
FIG. 1 is a plan view of a touch panel, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view of a touch panel, according to one or more exemplary embodiments. Although specific reference will be made to this particular implementation, it is also contemplated that the touch panel may embody many forms and include multiple and/or alternative components.

As shown in FIG. 1, the touch panel is configured to detect a touch (or hovering interaction), and includes a substrate SUB, a wiring part W, and a touch sensor unit TS. The touch panel may include a touch controller (not illustrated), which may be formed as a flexible printed circuit board (FPCB) or a printed circuit board (PCB) connected to the wiring part W. It is contemplated, however, that any other suitable implementation of a touch controller may be utilized in association with exemplary embodiments described herein. The touch controller may calculate (or otherwise determine) information about where a user touches (or otherwise interacts with) the touch panel by digitizing an analog electrical signal transmitted from the touch panel as a digital signal using, for instance, a converter or the like.

The substrate SUB may be flexible, and may include any suitable material, such as, for instance, an organic material, an inorganic material, glass, a metal, such as stainless steel, etc. Although the substrate SUB may be described as flexible, it is not limited thereto, and it may be stretchable, foldable, bendable, or rollable. Given that the substrate SUB is flexible, stretchable, foldable, bendable, or rollable, the entire touch panel may be flexible, stretchable, foldable, bendable, or rollable.

The wiring part W may be disposed in a peripheral region of the substrate SUB, e.g., disposed outside a touch sensing region of the substrate SUB. The wiring part W may be connected to the touch sensor unit TS. The wiring part W may couple the touch sensor unit TS to the touch controller, and may include an opaque conductive material, such as a metal, or the like, or a transparent conductive material. The wiring part W may be formed on the substrate SUB using the same process as (or a different process from) the process utilized to form the touch sensor unit TS.

The touch sensor unit TS is where a touch may be directly detected. The entire touch sensor unit TS may be transparently formed, however, exemplary embodiments are not so limited. The touch sensor unit TS is disposed on the substrate SUB, and may be formed as a capacitive type touch sensor unit. The touch sensor unit TS includes, on the substrate SUB, a first signal line SL1 extending in a first direction (e.g., an x-axis direction) to be connected to the wiring part W, and a second signal line SL2 extending in a second direction (e.g., a y-axis direction) crossing the first direction to be connected to the wiring part W.

As seen in FIG. 1, a plurality of first signal lines SL1 are present, and the plurality of first signal lines SL1 may be respectively and sequentially arranged in the second direction, e.g., spaced apart from one another in the second direction. The first signal lines SL1 may extend straight in the first direction, but they are not limited thereto, and may be bent at least once to extend in the first direction. A plurality of second signal lines SL2 are also present, and the plurality of second signal lines SL2 may be respectively and sequentially arranged in the first direction, e.g., spaced apart from one another in the first direction. The second signal lines SL2 extend straight in the second direction, but they are not limited thereto, and may be bent at least once to extend in the second direction. In this manner, the first and second signal lines SL1 and SL2 cross each other, but are insulated from each other. The first and second signal lines SL1 and SL2 are disposed on the same layer that is disposed on the substrate SUB.

According to one or more exemplary embodiments, when voltages are applied to the plurality of first signal lines SL1 and the plurality of second signal lines SL2, capacitance is generated between each of the first signal lines SL1 and each of the second signal lines SL2. In this manner, when the touch sensor unit TS detects a touch, capacitance changes at a position where the touch is detected to cause the voltage applied to the first signal line SL1 or second signal line SL2 to vary. To this end, the touch sensor unit TS of the touch panel may detect where on the touch panel the touch has occurred based on the variance of the capacitance.

Figure 2:
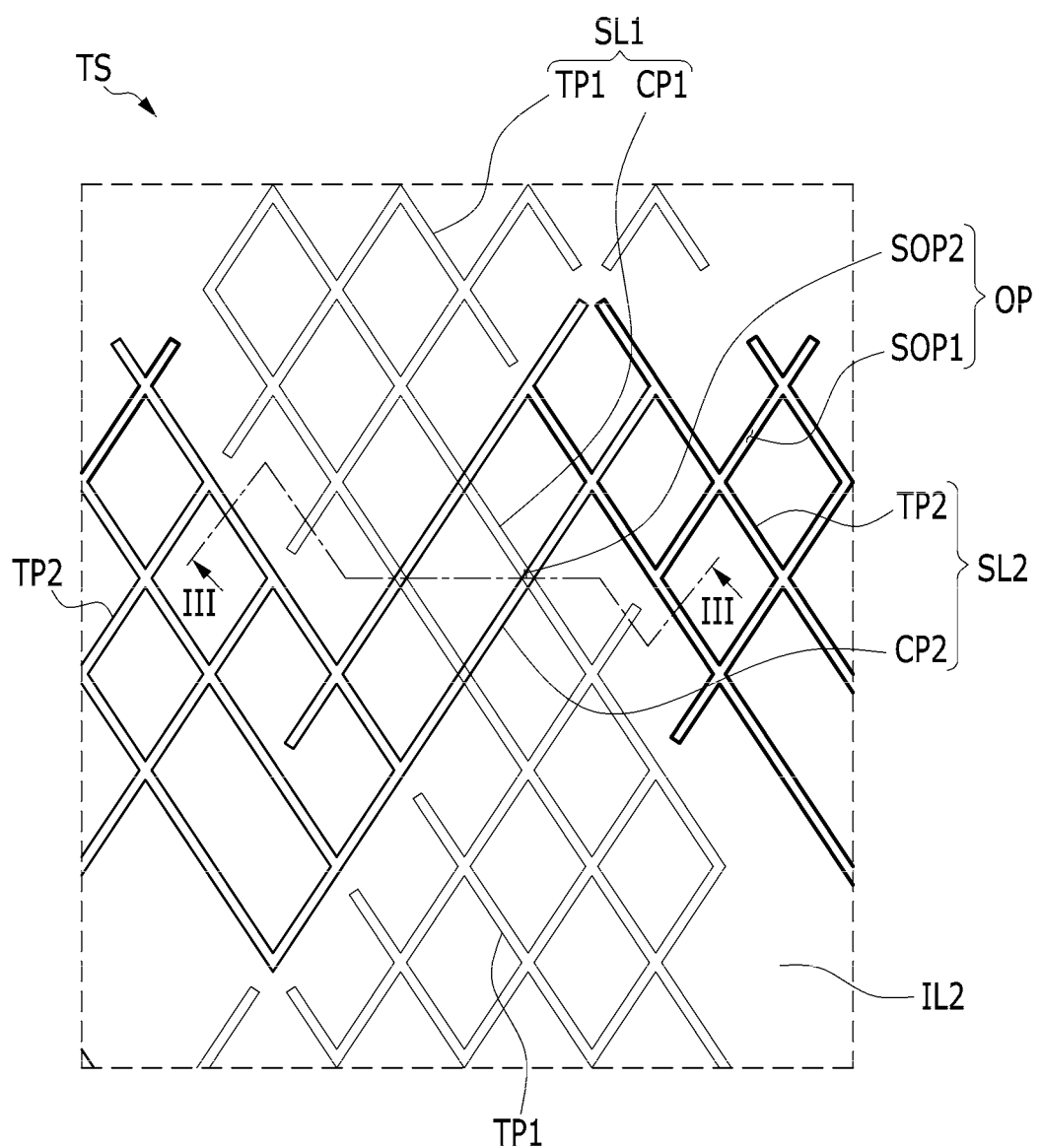
FIG. 2 is a plan view of portion "A" of the touch panel of FIG. 1, according to one or more exemplary embodiments.
Figure 3:
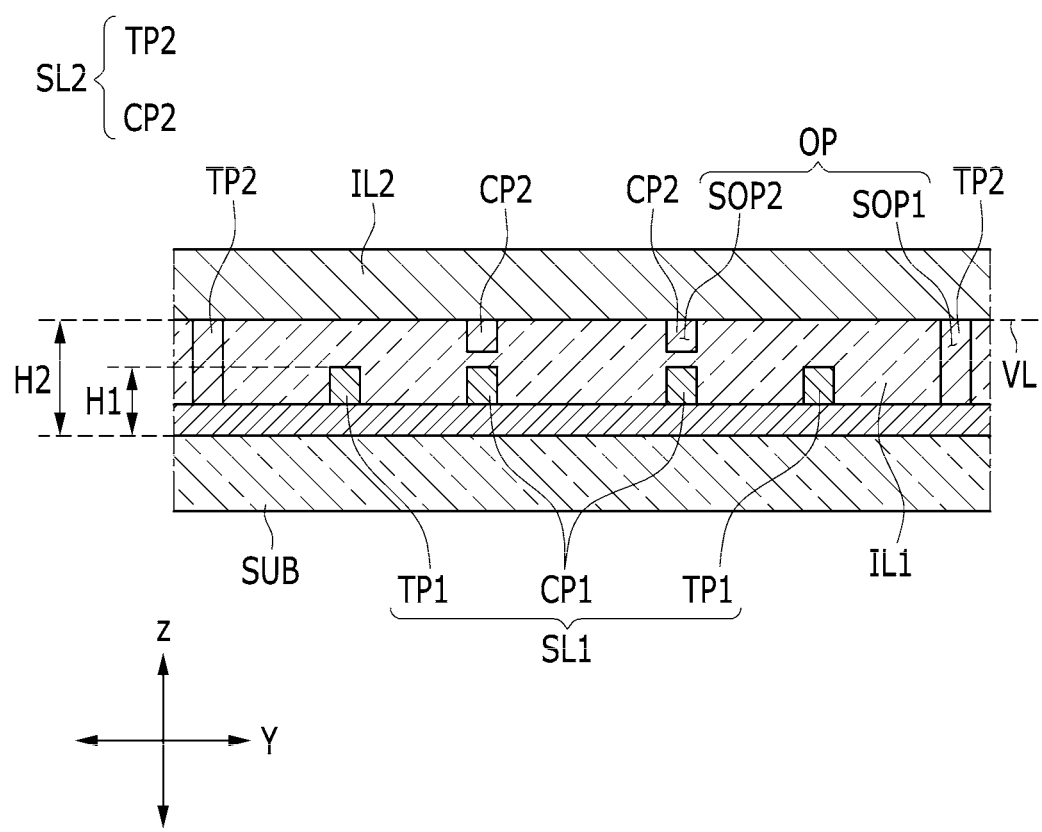
FIG. 3 is a cross-sectional view of the touch panel of FIG. 2 taken along sectional line according to one or more exemplary embodiments.

FIG. 2 is a plan view of portion "A" of the touch panel of FIG. 1, according to one or more exemplary embodiments. FIG. 3 is a cross-sectional view of the touch panel of FIG. 2 taken along sectional line III-III, according to one or more exemplary embodiments.

As shown in FIGS. 2 and 3, the touch sensor unit TS of the touch panel includes the first signal line SL1, a first insulating layer IL1 the second signal line SL2, and a second insulating layer IL2.

The first signal line SL1 includes a first sensing electrode TP1 and a first connecting portion CP1. A plurality of first sensing electrodes TP1 are present, and the plurality of first sensing electrodes TP1 are respectively spaced apart from one another in the first direction. The plurality of first sensing electrodes TP1 respectively includes metal mesh patterns of electrodes. Since the first sensing electrode TP1 includes a metal mesh formed from a metal, a signal transmitted via the first sensing electrode TP1 is suppressed from being delayed. It is contemplated, however, that although the first sensing electrode TP1 is shown as including a metal mesh pattern, exemplary embodiments are not limited thereto. Further, the first sensing electrode TP1 may be formed from a transparent conductive material, such as a silver nanowire (AgNW), aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PANI), poly(3,4-ethylenedioxythiophene) poly(styrenesulfonate) (PEDOT:PSS), etc.

The first sensing electrode TP1 has a first height H1 from the substrate SUB, e.g., a thickness dimension measured in a third direction (e.g., a z-axis direction), which may be orthogonal to the first and second directions. In this manner, the first height H1 may be a distance from a surface (e.g., upper surface) of the substrate SUB to a surface (e.g., upper surface) of the first sensing electrode TP1.

The first connecting portion CP1 interconnects each of the plurality of first sensing electrodes TP1, e.g., neighboring (or adjacent) first sensing electrodes TP1. The first sensing electrode TP1 and the first connecting portion CP1 are integrally formed, but exemplary embodiments are not limited thereto. To this end, the first sensing electrode TP1 and the first connecting portion CP1 may be formed of the same or different materials from one another. The first connecting portion CP1 crosses a second connecting portion CP2 while being insulated from the first connecting portion CP1.

The first connecting portion CP1 may have the same first height H1 from the substrate SUB as the first sensing electrode TP1. In this manner, the first height H1 may be a distance from the surface of the substrate SUB to a surface (e.g., upper surface) of the first connecting portion CP1. When the first sensing electrode TP1 and the first connecting portion CP1 respectively have the first height H1 from the substrate SUB, the first signal line SL1 has the first height H1 from the substrate SUB. As such, the first height H1 may be a distance from the surface of the substrate SUB to a surface (e.g., upper surface) of the first signal line SL1.

The first insulating layer IL1 covers the first signal line SL1. That is, the first insulating layer IL1 is disposed on the substrate SUB and covers the first sensing electrode TP1 and the first connecting portion CP1. The first insulating layer IL1 includes an opening OP in which the second signal line SL2 is disposed. The first insulating layer IL1 may include at least one of inorganic and organic materials, including at least one of a silicon nitride, a silicon oxide, and the like. The opening OP in the first insulating layer IL1 may have the same planar shape as the second signal line SL2. Further, the opening OP may include a first sub-opening SOP1 and a second sub-opening SOP2.

The second sensing electrode TP2 of the second signal line SL2 is disposed inside the first sub-opening SOP1. A plurality of first sub-openings SOP1 are present, and the plurality of first sub-openings SOP1 are respectively dispose about the second sub-openings SOP2. That is, the second sub-openings SOP2 are disposed between first sub-openings SOP1. In this manner, the first sub-openings SOP1 and the second sub-openings SOP2 are spaced apart from each other. The first sub-opening SOP1 may be formed deeper in a surface (e.g., upper surface) of the first insulating layer IL1 than the second sub-opening SOP1.

The second connecting portion CP2 of the second signal line SL2 is disposed inside the second sub-opening SOP2. In this manner, the second sub-opening SOP2 interconnects neighboring (e.g., adjacent) first sub-openings SOP1. That is, the second sub-opening SOP2 communicates with the first sub-opening SOP1, such that the second connecting portion CP2 may interconnect adjacent second sensing electrodes TP2. The second sub-opening SOP2 at least partially crosses the first connecting portion CP1, but is insulated from the first connecting portion CP1. The first insulating layer IL1 is disposed between the second sub-opening SOP2 and the first connecting portion CP1. The first connecting portion CP1 crossing the second sub-opening SOP2, and being insulated therefrom, may be at least partially formed shallower from the surface (e.g., upper surface) of the first insulating layer IL1 than the first sub-opening SOP1. It is also noted that the depth of the second sub-opening SOP2 may be smaller than the depth of the first sub-opening SOP1.

As seen in FIG. 3, the second signal line SL2 is disposed on the same layer over the substrate SUB as the first signal line SL1. To this end, the second signal line SL2 includes the second sensing electrode TP2 and the second connecting portion CP2. A plurality of second sensing electrodes TP2 are present, and the plurality of second sensing electrodes TP2 is respectively spaced apart from one another in the second direction. The plurality of second sensing electrodes TP2 respectively includes metal mesh patterns of electrodes. Since the second sensing electrode TP2 includes the metal mesh formed from a metal, a signal transmitted via the second sensing electrode TP2 is suppressed from being delayed. It is noted, however, that although the second sensing electrode TP2 is shown as including a metal mesh pattern, exemplary embodiments are not limited thereto. Further, the second sensing electrode TP2 may be formed from a transparent conductive material, such as a silver nanowire (AgNW), aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PAM), poly(3,4-ethylenedioxythiophene) poly(styrenesulfonate) (PEDOT:PSS), etc.

The second sensing electrode TP2 is disposed inside the first sub-opening SOP1 of the first insulating layerIL1 and, as a result, the second sensing electrode TP2 has a second height H2 from the substrate SUB (e.g., a thickness dimension measured in the third direction), which is greater than the first height H1. In this manner, the second height H2 may be a distance from the surface (e.g., upper surface) of the substrate SUB to a surface (e.g., upper surface) of the second sensing electrode TP2.

The second connecting portion CP2 interconnects the plurality of second sensing electrodes TP2, e.g., neighboring (or adjacent) second sensing electrodes TP2. The second sensing electrode TP2 and the second connecting portion CP2 are integrally formed, but exemplary embodiments are not limited thereto. To this end, the second sensing electrode TP2 and the second connecting portion CP2 may be formed of the same or different materials from one another. As previously mentioned, the second connecting portion CP2 is disposed inside the second sub-opening SOP2 of the first insulating layerIL1 and, as a result, an upper surface of the second connecting portion CP2 is the same distance (e.g., the second height H2) from the substrate SUB as the second sensing electrode TP2. In this manner, the second height H2 may be a distance from the surface (e.g., upper surface) of the substrate SUB to a surface (e.g., upper surface) of the second connecting portion CP2.

The second connecting portion CP2 crosses the first connecting portion CP1, but is insulated from the first connecting portion CP1 because it is at least partially disposed inside the second sub-opening SOP2 overlaying the first connecting portion CP1 with the first insulating layer disposed therebetween. The second connecting portion CP2 crossing the first connecting portion CP1 while being separated therefrom may at least partially have a smaller thickness than the second sensing electrode TP2. As described above, since the upper surfaces of the second sensing electrode TP2 and the second connecting portion CP2 respectively have the second height H2 from the substrate SUB, the second signal line SL2 has the second height H2 from the substrate SUB. In this manner, the second height H2 may be a distance from the surface of the substrate SUB to a surface of the second signal line SL2.

According to one or more exemplary embodiments, since the second signal line SL2 is disposed inside the opening OP of the first insulating layer IL1, the surface of the second signal line SL2 may be disposed on the same plane as the surface of the first insulating layer IL1. That is, the upper surfaces of the second signal line SL2 and the first insulating layer IL1 may be respectively disposed on the same imaginary line VL, and, thereby, coplanar. In order for the surfaces of the second signal line SL2 and the first insulating layer IL1 to be disposed on the same line, the surfaces of the second signal line SL2 and the first insulating layer IL1 may be polished, e.g., pre-polished.

As seen in FIG. 3, the second insulating layer IL2 covers the first insulating layer IL1. That is, the second insulating layer IL2 is disposed on the substrate SUB and covers the first insulating layer IL1 and the second signal line SL2. The second insulating layer IL2 may include at least one of inorganic and organic materials, including at least one of a silicon nitride, a silicon oxide, and the like. The second insulating layer IL2 may include the same material as the first insulating layer IL1.

According to one or more exemplary embodiments, since the first and second signal lines SL1 and SL2 respectively have the first and second heights H1 and H2 from the substrate SUB and are disposed on the same layer over the substrate SUB, when external light is radiated to and reflected from each of the first and second signal lines SL1 and SL2, the visibility of the first and second signal lines SL1 and SL2 are suppressed from being recognized from the outside since paths taken by the reflected light are not significantly different from each other. In addition, when the first signal line SL1 is covered by the first insulating layer IL1 and the second signal line SL2 is disposed inside the opening OP of the first insulating layer IL1 to minimize a thickness of the first insulating layerIL1 differences in the paths taken by the external light radiated to and reflected from each of the first and second signal lines SL1 and SL2 may be minimized because the first and second signal lines SL1 and SL2 respectively have a substantially similar thicknesses. As such, the first and second signal lines SL1 and SL2 are respectively suppressed from being recognized from the outside. That is, the touch panel in which the first and second signal lines SL1 and SL2 are suppressed from being recognized from the outside is provided.

Furthermore, according to one or more exemplary embodiments, since the first sensing electrode TP1 and the first connecting portion CP1 included as part of the first signal line SL1 are integrally formed, and the second sensing electrode TP2 and the second connecting portion CP2 included as part of the second signal line SL2 are integrally formed, contact resistance between the first sensing electrode TP1 and the first connecting portion CP1 and contact resistance between the second sensing electrode TP2 and the second connecting portion CP2 are minimized. In this manner, signals respectively transmitted via the first and second signal lines SL1 and SL2 are suppressed from being delayed. That is, since the signals are suppressed from being delayed, the touch panel including the touch sensor unit TS may be provided with improved touch sensitivity.

Additionally, according to one or more exemplary embodiments, since both the first sensing electrode TP1 and the second sensing electrode TP2 of the touch sensor unit TS may include metal mesh patterns, the signals respectively transmitted via the first and second signal lines SL1 and SL2 may be suppressed from being delayed because both the first sensing electrode TP1 and the second sensing electrode TP2 have lower electrical resistance than a non-mesh transparent conductive oxide, such as indium tin oxide (ITO). That is, since the signals respectively transmitted via the first and second signal lines SL1 and SL2 are suppressed from being delayed, the touch panel including the touch sensor unit TS may be provided with improved touch sensitivity. It is also noted that the mesh patterns enable the substrate SUB to be flexibly formed, and, overall flexibility is improved. That is, the flexible touch panel may be optimized for a flexible display panel.

According to one or more exemplary embodiments, the first sensing electrode TP1 and the second sensing electrode TP2 respectively include metal mesh patterns, and, as such, even if stress is generated in the touch panel as the touch panel is bent, the first and second sensing electrodes TP1 and TP2 including the metal mesh patterns may be respectively and easily bent by the stress because the stress may be distributed across each of the first and second sensing electrodes TP1 and TP2. In this manner, the first and second sensing electrodes TP1 and TP2 may be respectively prevented from being broken by the bending stress. That is, a touch panel may be provided that is prevented from being broken by bending stresses.

A method of manufacturing a touch panel according to one or more exemplary embodiments will now be described with reference to FIGS. 4 to 9. It is noted that the touch panel of FIGS. 1-3 may be manufactured using the method of FIGS. 4 to 9.

Figure 4:
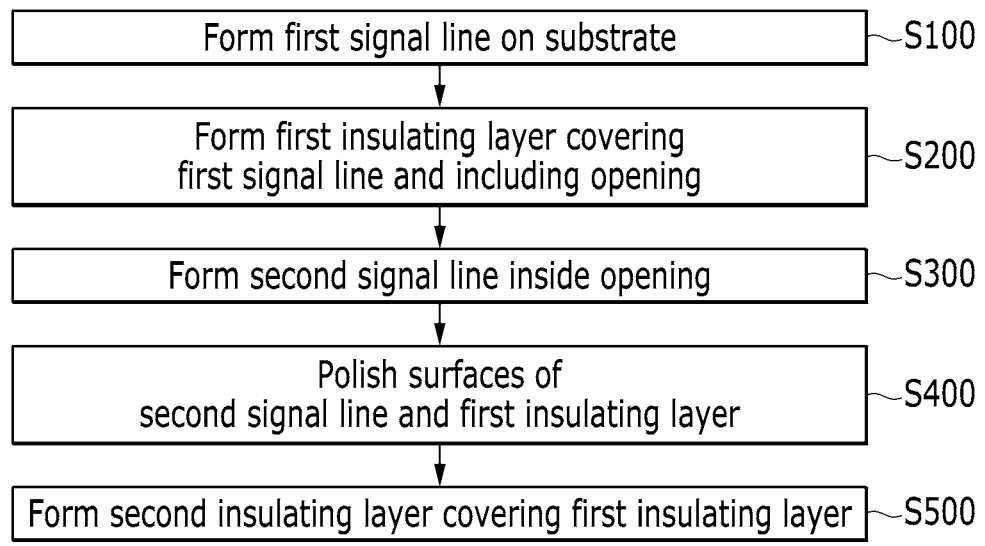
FIG. 4 is a flowchart of a process for manufacturing a touch panel, according to one or more exemplary embodiments.

FIG. 4 is a flowchart of a process for manufacturing a touch panel, according to one or more exemplary embodiments. FIGS. 5 to 9 are respective cross-sectional views of a touch panel at various stages of manufacture, according to one or more exemplary embodiments.

Figure 5:
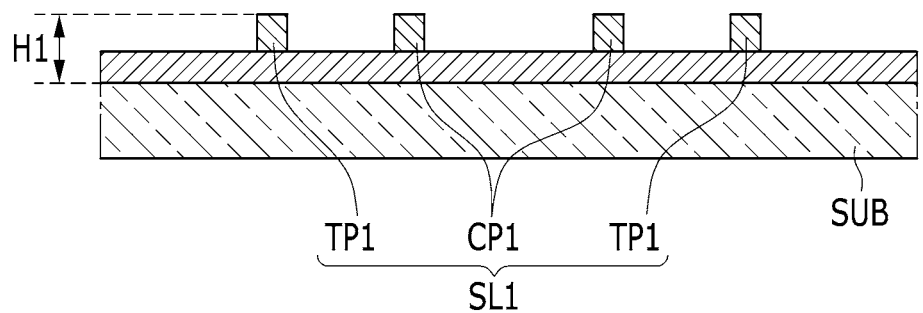
FIGS. 5, 6, 7, 8, and 9 are respective cross-sectional views of a touch panel at various stages of manufacture, according to one or more exemplary embodiments.

As shown in FIGS. 4 and 5, a first signal line SL1 is formed on a substrate SUB (S100). That is, after a buffer layer is formed on the substrate SUB and a metal layer is formed on the buffer layer, the metal layer is patterned using microelectromechanical systems (MEMS) technology, such as a photolithography process using a mask, to form a first signal line SL1 including a first sensing electrode TP1 and a first connecting portion CP1. The first sensing electrode TP1 and the first connecting portion CP1 extend in a first direction, are spaced apart from one another in a second direction, and have a first height H1 from an upper surface of the substrate SUB in a third direction orthogonal to the first and second directions.

Figure 6:
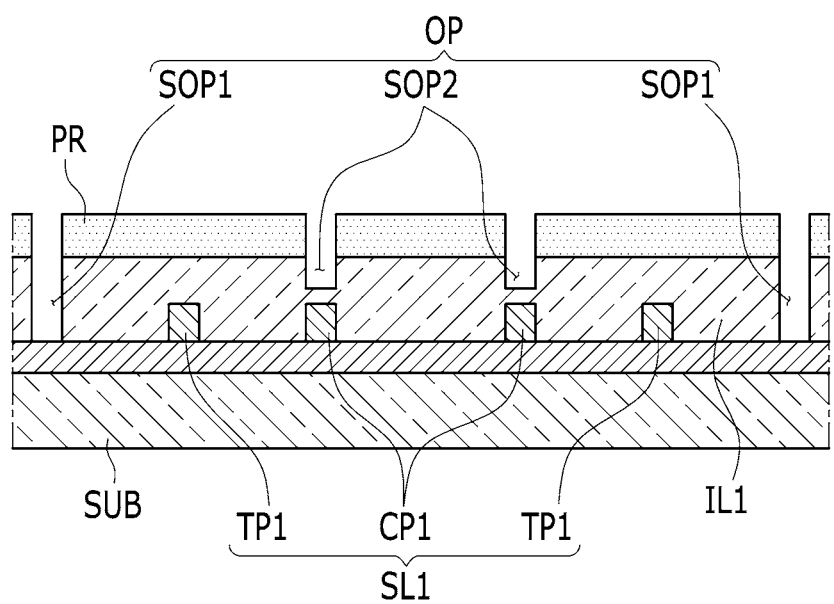

As shown in FIGS. 4 and 6, a first insulating layer IL1 covering the first signal line SL1 and including an opening OP is formed (S200). That is, after the first insulating layer IL1 covering the first signal line SL1 is formed and a photoresist layer is formed on the first insulating layerIL1 the photoresist layer is exposed to light and developed, thereby forming a photoresist pattern PR. Next, an opening OP including a first sub-opening SOP1 and a second sub-opening SOP2 is formed in the first insulating layer IL1 by selectively etching the first insulating layer IL1 using the photoresist pattern PR as a mask. In this manner, the first insulating layer IL1 covering the first signal line SL1 and including the opening OP that extends in a second direction crossing a first direction is formed.

Figure 7:
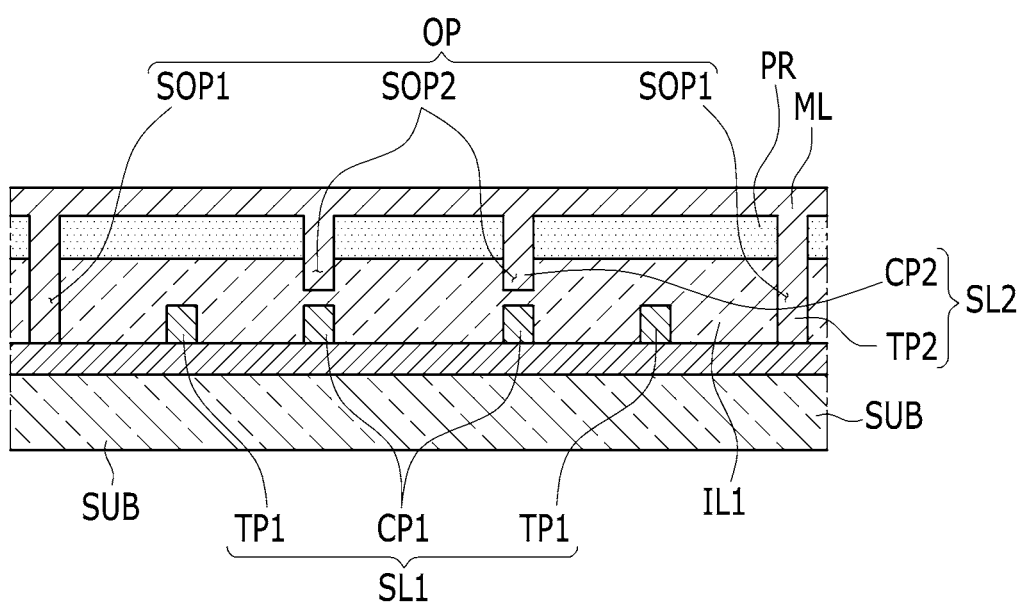

According to FIGS. 4 and 7, a second signal line SL2 is formed inside the opening OP (S300). That is, a metal layer ML is formed on the photoresist pattern PR. Since the metal layer ML is filled in each of the first and second sub-openings SOP1 and SOP2 of the opening OP, a second sensing electrode TP2 and a second connecting portion CP2 are respectively formed inside each of the first and second sub-openings SOP1 and SOP2 of the opening OP. In this manner, the second signal line SL2 is formed. Subsequently, by removing the metal layer ML disposed on the photoresist pattern and then ashing or lifting off the photoresist pattern PR from the first insulating layer IL1, a metal material disposed on the second signal line SL2 may be removed.

Figure 8:
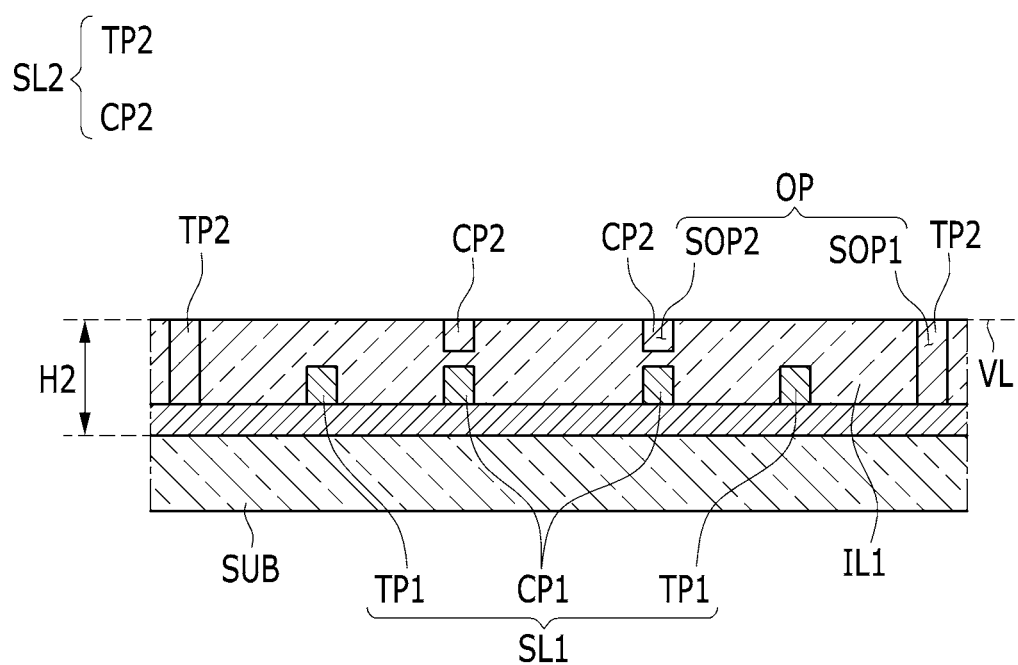

As shown in FIGS. 4 and 8, a surface of the second signal line SL2 and a surface of the first insulating layer IL1 are polished (S400). For instance, a chemical polishing method using an etchant or a physical polishing method using an abrasive is used to polish the surface of the second signal line SL2 and the surface of the first insulating layer IL1. Since the surfaces of the second signal line SL2 and the first insulating layer IL1 are polished, the surfaces of the second signal line SL2 and the first insulating layer IL1 are formed on the same imaginary line VL, e.g., are coplanar with one another. Accordingly, the second signal line SL2, which extends on the substrate SUB in the second direction may have a second height H2 greater than the first height H1 from the substrate SUB is formed inside the opening OP.

Figure 9:
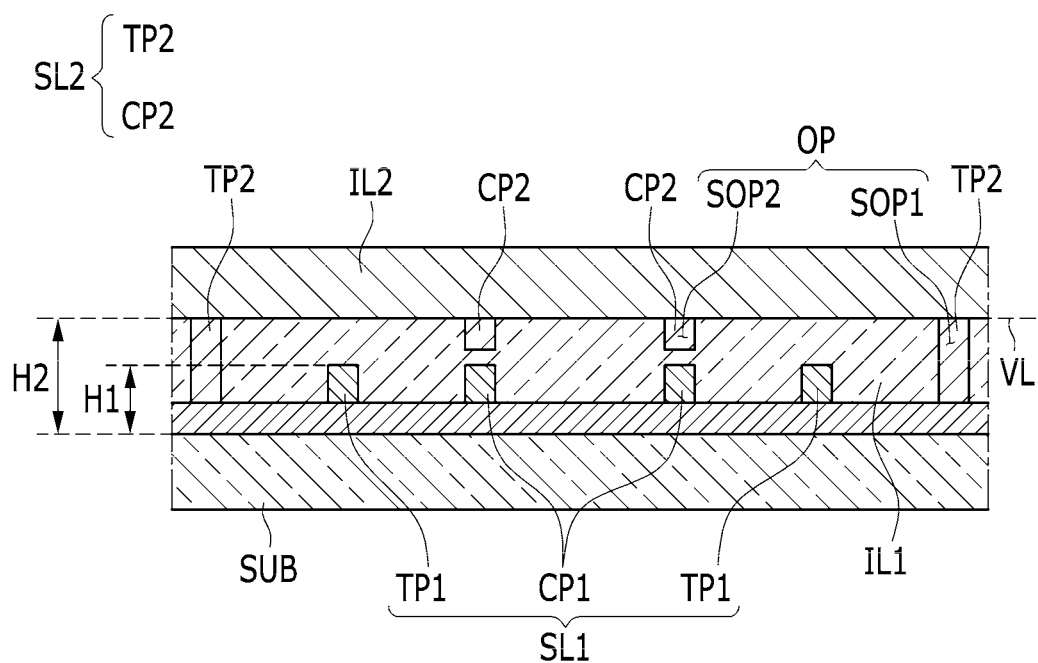

According to FIGS. 4 and 9, a second insulating layer IL2 covering the first insulating layer IL1 is formed (S500). That is, a second insulating layer IL2 including the same or similar material as the first insulating layer IL1 is formed on the first insulating layer IL1, such that the second insulating layer IL2 covering the first insulating layer IL1 is formed. It is noted that the first and second insulating layers IL1 and IL2 positioned at a periphery of the substrate SUB may be respectively etched to form a peripheral opening. As such, a wiring part W connected to a touch controller formed as, for instance, a flexible printed circuit board (FPCB) or a printed circuit board (PCB), may be connected to each of the first and second signal lines SL1 and SL2 via the peripheral opening.

According to one or more exemplary embodiments, the first and second signal lines SL1 and SL2 are formed such that they respectively have the first height H1 and the second height H2 from the substrate SUB and are disposed on the same layer over the substrate SUB. In this manner, when external light is radiated to each of the first and second signal lines SL1 and SL2 and is then reflected by each of the first and second signal lines SL1 and SL2, paths taken by the reflected light are not much different from each other. As such, the method enables a touch panel to be formed in which the first and second signal lines SL1 and SL2 are suppressed from being recognized from the outside.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
   a substrate;
   a first signal line extending on the substrate in a first direction, the first signal line comprising a first height from the substrate;
   a first insulating layer covering the first signal line, the first insulating layer comprising:
   a first sub-opening; and
   a second sub-opening extending from the first sub-opening;
   a second signal line extending on the substrate in a second direction crossing the first direction, the second signal line comprising:
   first sensing electrodes spaced apart from each other in the second direction, the first sensing electrodes being disposed in the first sub-opening; and
   a first connecting portion connecting the first sensing electrodes together, the first connecting portion being disposed in the second sub-opening,
   wherein the second signal line comprises a second height from the substrate,
   wherein the second signal line is disposed in the same layer as the first signal line, and
   wherein the second height is greater than the first height.

2. The touch panel of claim 1, wherein:
   the first height is a distance from an upper surface of the substrate to an upper surface of the first signal line; and
   the second height is a distance from the upper surface of the substrate to an upper surface of the second signal line.

3. The touch panel of claim 1, wherein:
   the first signal line comprises:
   second sensing electrodes spaced apart from each other in the first direction; and
   a second connecting portion connecting the second sensing electrodes together;

the second connecting portion crosses the first connecting portion; and the second connecting portion is insulated from the first connecting portion.

4. The touch panel of claim 3, wherein the first sensing electrodes and the second sensing electrodes comprise mesh patterns.

5. The touch panel of claim 3, wherein:
the first sensing electrode and the first connecting portion are integrally formed; and
the second sensing electrode and the second connecting portion are integrally formed.

6. The touch panel of claim 3, wherein:
the second sub-opening crosses the second connecting portion; and
the second sub-opening is spaced apart from the second connecting portion.

7. The touch panel of claim 1, wherein a thickness of the first connecting portion is thinner than a thickness of a first sensing electrode among the first sensing electrodes.

8. The touch panel of claim 1, wherein the first sub-opening extends deeper into the surface of the first insulating layer than the second sub-opening.

9. The touch panel of claim 1, wherein the substrate is a flexible substrate.

10. The touch panel of claim 1, wherein an upper surface of the second signal line is coplanar with an upper surface of the first insulating layer.

11. The touch panel of claim 10, wherein the upper surface of the second signal line and the upper surface of the first insulating layer are polished surfaces.

12. The touch panel of claim 10, further comprising:
a second insulating layer covering the second signal line and the first insulating layer.

13. A method of manufacturing a touch panel, the method comprising:
forming a first signal line on a substrate, the first signal line extending in a first direction;
forming a first insulating layer on the substrate, the first insulating layer covering the first signal line;
patterning the first insulating layer to form an opening extending in a second direction crossing the first direction, the opening comprising:
a first sub-opening; and
a second sub-opening extending from the first sub-opening; and
forming a second signal line in the opening, the second signal line comprising:
first sensing electrodes spaced apart from each other in the second direction, the first sensing electrodes being disposed in the first sub-opening; and
a first connecting portion connecting the first sensing electrodes together, the first connecting portion being disposed in the second sub-opening,
wherein the second signal line extends in the second direction, and
wherein a first height of the first signal line from the substrate is smaller than a second height of the second signal line from the substrate.

14. The method of claim 13, further comprising:
polishing a surface of the second signal line and a surface of the first insulating layer.

15. The method of claim 14, wherein the surface of the second signal line and the surface of the first insulating layer are simultaneously polished.

16. The method of claim 13, further comprising:
forming a second insulating layer on the substrate, the second insulating layer covering the first insulating layer.

17. The method of claim 13, wherein an upper surface of the second signal line is coplanar with an upper surface of the first insulating layer.

18. A touch panel, comprising:
a substrate;
a first signal line extending on the substrate in a first direction, the first signal line comprising a first height from the substrate; and
a second signal line extending on the substrate in a second direction crossing the first direction, the second signal line comprising a second height from the substrate,
wherein the second signal line is disposed in the same layer as the first signal line,
wherein the second height is greater than the first height, and
wherein a thickness of at least a part of the second signal line is thicker than a thickness of the first signal line.

19. A method of manufacturing a touch panel, the method comprising:
forming a first signal line on a substrate, the first signal line extending in a first direction;
forming, on the substrate, a first insulating layer covering the first signal line, the first insulating layer comprising an opening extending in a second direction crossing the first direction; and
forming a second signal line in the opening, the second signal line extending in the second direction,
wherein a first height of the first signal line from the substrate is smaller than a second height of the second signal line from the substrate, and
wherein a thickness of at least a part of the second signal line is thicker than a thickness of the first signal line.

20. A touch panel, comprising:
a substrate;
a first signal line extending on the substrate in a first direction, the first signal line comprising a first height from the substrate; and
a second signal line extending on the substrate in a second direction crossing the first direction, the second signal line comprising a second height from the substrate,
wherein the second signal line is disposed in the same layer as the first signal line,
wherein the second height is greater than the first height, and
wherein the upper surface of the second signal line is coplanar with an upper surface of the first insulating layer.

21. The touch panel of claim 20, wherein the upper surface of the second signal line and the upper surface of the first insulating layer are polished surfaces.

22. The touch panel of claim 20, further comprising:
a second insulating layer covering the second signal line and the first insulating layer.

* * * * *